United States Patent Office 2,820,742
Patented Jan. 21, 1958

2,820,742

SYNTHESIS OF STRAINS OF MICRO-ORGANISMS

Guido Pelligrino Arrigo Pontecorvo and Joseph Alan Roper, Glasgow, Scotland, assignors to National Research Development Corporation, London, England, a corporation of Great Britain No Drawing. Application October 24, 1952
Serial No. 316,794

Claims priority, application Great Britain
October 24, 1951

6 Claims. (Cl. 195—79)

This invention relates to a manufacture of new strains of micro-organisms, which is applicable to micro-organisms in which reproduction is normally asexual, and to processes in which such strains are employed.

It has not hitherto been possible to synthesise strains of an asexual micro-organism which combine in a desired way different properties of two existing strains or which show new desired properties as a result of this combination. It is an object of the invention to provide a process, other than sexual reproduction for the production of new strains of this kind.

A further object of the invention is to improve industrial fermentation processes and other processes involving micro-organisms by the use of improved strains produced according to the invention. Another object is to provide useful products of such processes having new or improved qualities, in improved yields, or with greater economy or other advantages.

According to the invention there is provided a process for the manufacture of new strains of micro-organisms, which comprises the selection of two strains of a micro-organism whose genetical factors it is desired to combine, and having genetical markers which enable the strains to be easily distinguished, growing a heterokaryon of these strains, selecting and establishing environmental conditions for the heterokaryon which will induce and/or favour the formation and/or multiplication of heterozygous nuclei in which the factors of the marked strains are combined, recognising the cells carrying these heterozygous nuclei by means of the markers and establishing a strain thereof, and selecting from the latter strain a stable homozygous recombinant strain which is produced from the heterozygous strain by mitotic crossing-over and combines in a desired manner the different genetical factors of the originally selected strains.

Where the original strains do not naturally differ from each other in respect of suitable genetical markers, the latter may be produced as mutants by known genetical methods, for example by irradiation. The markers may be such as to generate any difference in properties which enables the strains to be distinguished from each other, such as nutritional requirements, growth habits or colours, for instance spore colours in the case of fungi.

The growing of a heterokaryon from the parent strains is facilitated if the latter have different nutritional requirements such that the nutrient required by one strain is supplied by the other. It is then possible to grow a balanced heterokaryon on a medium containing neither of these nutrients. It is usually possible by means of well known techniques to produce mutants having the desired nutritional properties in the event that there are no suitable natural strains having these properties, and a feature of the invention consists in producing such mutants as a step in the synthesis described above.

The aforesaid environmental conditions may be afforded by a polyploidogenic agent, such as camphor, acenaphthene, colchicine, borneyl chloride or the like, or by a poisonous or other environment which strongly disfavours the original unfused nuclei, even if multiplying in a heterokaryon and strongly favours or otherwise permits the growth of the heterozygous fused nuclei that occur, though with extreme rarity, even in asexually reproducing organisms. The mode of operation of the environment does not appear to be of practical significance, as the result is the same in either case: the production of a strain having the heterozygous fused nuclei. It is, indeed, possible that the function of some or all of the agents mentioned above may be to reduce the density of the parent nuclei rather than to induce fusion.

In a proportion of the heterozygous nuclei mitotic crossing-over occurs, and stable homozygous recombinant nuclei are produced. A proportion of these recombinants include one or more of the types which embody the desired genetical factors of the original strains, and such recombinant or recombinants can be recognised with the aid of these factors and/or the genetical markers already referred to, and can be selected so as to establish the desired new strain or strains.

Where the recognition of the desired recombinant is more difficult than that of a sister complementary recombinant, the labour of selecting the desired recombinant can be reduced by taking advantage of our discovery that sister recombinants tend to occur in neighbouring areas of a culture. Hence by removing from the heterozygote culture a part adjacent to the more easily recognised of the sister recombinants, a culture can be obtained in which the percentage of the desired, but less easily recognised, sister recombinant will be much higher than in the original heterozygote culture. This procedure can be utilised, for example, where the undesired sister recombinant is visually distinguishable from the parent heterzygote, while the desired sister recombinant is not distinguishable in this way.

Such a case is likely to occur where the visual distinction is due to a mutant genetical marker, since, in general, strains not having artificially produced mutants are more valuable for industrial uses.

The invention will be further described with reference to the following examples:

*Example 1.—Aspergillus nidulans*

In this species sexual reproduction occurs side by side with vegetative reproduction so that a cross-check of results is available.

Two haploid strains (obtained by irradiation, crossing, etc.) are used in the example.

(1) $w$ $AD_2$ $Y$ $lys$
(2) $W$ $ad_2$ $y$ $LYS$

Capital letters indicate the wild type alleles. The $w$, $ad_2$ and $y$ loci are linked, in this order. These genes have the following effects: $w/W$ colourless v. coloured conidia; $ad_2/AD_2$ requirement for v. independence of adenine; $y/Y$ yellow v. green conidia; $lys/LYS$, requirement for v. independence of lysine. Strain (1) had, thus, white conidia and required lysine but synthesised adenine; strain (2) had yellow conidia and required adenine but synthesised lysine. A "balanced heterokaryon" was formed, growing on agar medium in the absence of both lysine and adenine, and having both white and yellow conidia (conidia of *A. nidulans* are uninucleate and the effect of the two genes $w/W$ and $y/Y$ on colour is autonomous).

5 mm. squares of the agar with hyphal tips of the balanced heterokaryon were transferred on to the same kind of fresh agar medium and incubated for 24 h. at 37° C. after which about 100 mg. oaf d-camphor were put on the lid inside the petri dish, and incubation at 37° C.

continued for 5 hours. The lid with camphor was then replaced by a sterile new lid.

After further incubation for a few days, some of the inocula, now grown to about 5 cm. diameter, showed sectors or individual heads with green conidia. These were isolated, purified by single conidium isolation with the micromanipulator and a strain established. The strain had green conidia, was able to grow in the absence of lysine and adenine, and all the necessary tests (e. g. segregation through ascospores) showed it to have diploid nuclei heterozygous for all the genes in which the parents differed. The genotype of this diploid strain can be written down as $$\begin{array}{cccc} w & AD_2 & Y & lys \\ W & ad_2 & y & LYS \end{array}$$

The diploid strain was then grown on agar medium supplemented with adenine and lysine. After the whole surface of the petri dish had been covered, a careful inspection was carried out under the stereoscopic microscope. This revealed a small proportion of heads, groups of heads, or conidial chains, differing from the majority in being white or yellow instead of green. From several plates 51 individual white or yellow heads were successfully isolated and 51 strains established from single conidium micromanipulation. These 51 purified strains were tested for growth factor requirements, with the following results:

|  | Requiring for growth | | | | |
| --- | --- | --- | --- | --- | --- |
|  | Lysine | Adenine | Both | Neither | Total |
| Yellow | 0 | 8 | 2 | 1 | 11 |
| White | 1 | 2 | 1 | 36 | 40 |
|  | 1 | 10 | 3 | 37 | 51 |

A proportion at least (7 out of 11) of the yellow strains were shown to be still diploid and heterozygous for the other genes in which the "parent" strains differed.

This example demonstrates: (a) the production of a strain carrying in its vegetative cells nuclei diploid and heterozygous for all the genetic markers for which the two original haploid strains differed; and (b) the obtaining of stable (homozygous), as well as unstable (heterozygous) strains combining and recombining the properties (i. e. colours and growth factor requirements) of the two parent strains, as well as showing new properties (e. g. green conidia).

The technique as exemplified above has been applied to the production of several other diploids: in all, ten genes have been used in different combinations with consistent results in every case.

Variations of the technique have been used or could be used: for example (1) when no genetic markers for colour are available, the heterozygous diploids are selected by plating of conidial suspensions on appropriate selective media; (2) instead of camphor, other "polyploidogenic" agents could be used, such as acenaphtene, colchicine, borneyl chloride, etc. and probably heat shocks, low temperature shocks or irradiation; and in short any agent or means capable of disrupting the formation of the spindle, altering the surface properties of the nuclear membrane, probably a variety of non-specific toxic conditions.

*Example 2.—Aspergillus niger*

This species is an asexually reproducing fungus which is used extensively in citric acid fermentation, and is also used for the production of proteolytic enzymes and is probably usable for the production of sterols.

The normal type of *A. niger* has black spores. Two strains differing in colour, and produced by irradiation, were used: A, with fawn spores and F, with olive spores. When grown together these two strains occasionally produce heterokaryotic heads ranging from slightly darker than either A or F to as dark as the normal type: the genetic control of the differences in colour is in this case not cell-localized, with the result that individual chains of spores in one heterokaryotic head do not differ obviously from one another, but the heterokaryotic head, as a whole, differs from those of either parent.

The two strains A (fawn) and F (olive) were irradiated and mutants differing from A or F, respectively, in nutritional requirements were obtained as follows:
(1) Derived from A: fawn spores, requirement for vitamin $B_1$.
(2) Derived from F; olive spores, requirement for the amino acid histidine.

Heterokaryons between the two strains were formed. As expected, these balanced heterokaryons could grow, though at a reduced rate, on a medium lacking both $B_1$ and histidine. The heterokaryons had a majority of black heads plus a proportion of heads of intermediate colours in a whole range down to fawn or olive. The heterokaryons were treated with camphor vapour for a limited time and then allowed further growth in a camphor-free atmosphere. Some of this further growth showed patches with uniformly black heads.

Isolation and purification from these patches as described below led to the establishment of what subsequently proved to be diploid strains heterozygous for the factors differentiating the two parent strains: that is, for fawn (A/a), for olive (O/o), for $B_1$ requirement (THI/*thi*) and for histidine requirement (HIST/*hist*). These diploids were able to grow on a medium lacking $B_1$ and histidine, and, apart from the rare segregation and recombination to be mentioned presently, they gave uniform growth with black spores; the colour of these spores is however, distinguishably lighter than in the normal haploid strains of *A. niger*.

In an alternative procedure, the heterokaryon was not treated with camphor. In this case heterozygous diploids were formed, but only with extreme rarity, and were able to establish themselves by virtue of the fact that they were strongly favoured over the heterokaryon by their greater ability to synthesise vitamin $B_1$ and histidine.

By micromanipulation of a single conidium from one of the presumed diploid patches a strain was established. Grown on a medium containing vitamin $B_1$ and histidine, this strain occasionally produced mitotic recombinants having fawn or olive heads like those of either parent strain. Isolation, purification and testing of the strains derived from these heads led to the following results:

|  | Requiring for growth | | | | |
| --- | --- | --- | --- | --- | --- |
|  | $B_1$ | Histidine | Both | Neither | Total |
| Fawn | 1 | 1 | 0 | 40 | 42 |
| Olive | 0 | 1 | 0 | 3 | 4 |
|  | 1 | 2 | 0 | 43 | 46 |

Thus, of 46 isolates, 44 show properties associated in ways different from those of the parents, namely, 43 have the colour of one or of the other parent but the nutritional requirement of neither, and one has the colour of one parent (fawn) and the requirement of the other (histidine).

The four olive recombinant strains recovered above ("first order recombinants") are capable of giving further recombinant types ("second order") identifiable by inspection, having fawn heads lighter than those of the original fawn strain. These new recombinant types are presumably homozygous for both colour factors. The fawn "first order" recombinants may or may not give this lighter type, but the difference in shade is not sharp enough to be identifiable in a single head. Furthermore, some of the above "first order" recombinants are capable of giving "second order" recombinants in respect of the other properties in which the parent strains differed.

For instance, from a fawn, histidine requiring strain a fawn histidine and aneurin requiring strain can be isolated. By repeating this procedure all possible recombinant types were obtained.

An appreciable proportion of the patches with fawn heads arising in the heterozygous diploid strain are found side by side with patches having heads much darker than those of the diploid parent and as dark as those of a normal strain of *A. niger*. Isolation from some of these darker patches led to the establishment of strains which give olive mitotic recombinants, but not fawn. There seems to be little doubt that these darker patches are derived from the sister nucleus of the fawn recombinant in the following way:

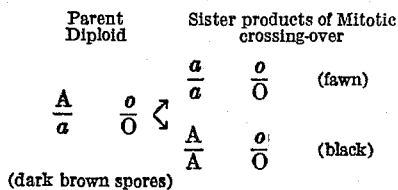

This demonstrates the fact that sister recombinants are found in neighbouring areas, which fact, as stated above, can be used to facilitate recovery of a recombinant strain which is indistinguishable or distinguishable only with difficulty from the heterozygous parent, but which has a more easily distinguishable sister recombinant.

In addition to the two species of Aspergillus referred to above, the new process is also applicable to *Penicillium chrysogenum* (the species used for penicillin production) in which sexual reproduction is not known to occur, and can undoubtedly be applied to various species of Streptomyces and to many other, species of micro-organisms, particularly of filamentous fungi, for the purpose of producing strains with improved industrial qualities.

When camphor or other suitable agent is used to encourage the formation and/or the multiplication of heterozygous diploid nuclei, it operates in a manner analogous to a catalyst in a chemical reaction, the heterozygous diploid being the analogue of a chemical compound whose derivatives (in the present case the new strains) exhibit properties derived from both starting materials (the parent strains), and/or new properties emerging from the new combinations.

What we claim is:

1. A process for the manufacture of new strains of micro-organisms, which comprises the selection of two strains of a micro-organism whose genetical factors it is desired to combine, and having genetical markers which enable the strains to be easily distinguished and complementary nutritional requirements or complementary sensitivity to poisons; inoculating the strains in a medium deficient in the complementary nutrients or containing the complementary poisons of the strains as the case may be; growing the heterokaryon so formed, or its conidia, in at least a similar medium, thereby favoring multiplication of heterozygous nuclei in which the factors of the marked strains are combined; recognizing the cells carrying these heterozygous nuclei by means of the markers and establishing a strain thereof; and selecting from the latter strain a stable recombinant strain which is produced from the heterozygous strain and which combines in a desired manner the different genetical factors of the originally selected strains.

2. A process as defined in claim 1, wherein the micro-organisms are fungi.

3. A process as defined in claim 1, wherein the genetical markers are artificially produced mutants.

4. A process as defined in claim 2, wherein the said mutants are produced by irradiation.

5. A process as defined in claim 1, wherein the heterokaryon is treated with a polyploidogenic agent.

6. A process as defined in claim 1, wherein, when a desired mitotic recombinant is less easily recognized than a sister recombinant, such desired recombinant is selected by removing from the heterozygous culture a part thereof adjacent to such sister recombinant.

References Cited in the file of this patent

UNITED STATES PATENTS 2,571,115    Davis _____ Oct. 16, 1951

FOREIGN PATENTS 560,800    Great Britain _____ Apr. 20, 1944

OTHER REFERENCES

Foster: Chemical Activities of Fungi, pp. 211 through 215, 221–228.

Thom et al.: Manual of the Aspergilli, Williams & Wilkins, 1945, pp. 74–78.

Hollaender et al.: Quantitative Irradiation Experiments with Neurospora Crassa, II, Ultraviolet Irradiation, Am. Jour. Botany, April 1945, pages 218–235.